United States Patent Office 3,520,907
Patented July 21, 1970

3,520,907
RECOVERY OF HYDROPHILIC OXIRANE COMPOUNDS
Wallace E. Taylor and Hubert H. Thigpen, Corpus Christi, Tex., assignors to Celanese Corporation, New York, N.Y., a corporation of Delaware
No Drawing. Filed Jan. 13, 1967, Ser. No. 609,015
Int. Cl. C07d 1/18
U.S. Cl. 260—348.5                       6 Claims

ABSTRACT OF THE DISCLOSURE

In a process for producing a hydrophilic epoxide, e.g. glycidol, by reacting its olefinic precursor with an epoxidizing agent which forms a carboxylic acid as a by-product of the epoxidation reaction, the epoxide product is separated from the carboxylic acid by dual-solvent extraction. One of the extraction solvents comprises water and the other comprises a water-immiscible solvent for the acid. The water-immiscible solvent is advantageously a mixture of a hydrocarbon with an ester of the carboxylic acid.

---

The present invention relates to the purification of epoxy compounds. More particularly it relates to a means of separating epoxy compounds of high water solubility from other compounds, especially carboxylic acids, which tend to react with them.

Epoxy compounds have important commercial uses in the manufacture of surface coatings, adhesives, and plastics, and are also useful intermediates in the synthesis of other organic chemicals. For example, glycols can be manufactured by hydrolyzing the corresponding epoxides.

An epoxide can be formed by reacting the corresponding olefinic compound with a peroxycarboxylic acid or with other epoxidizing agents such as acetaldehyde monoperacetate, one equivalent of the epoxidizing agent reacting, theoretically, with one equivalent of olefin to produce one equivalent of epoxide. Co-pending application Ser. No. 788,280, filed Jan. 22, 1959 and now U.S. Pat. No. 3,341,556, describes, for example, the epoxidation of propylene with peroxyacetic acid to produce 1,2-propylene oxide.

In every case in which the epoxidizing agent is a peroxycarboxylic acid or a related peroxycarboxylate such as acetaldehyde monoperacetate, at least one mole of the carboxylic acid corresponding to the epoxidizing agent is produced as a co-product for every equivalent of epoxide formed in the epoxidation reaction. Therefore in every such case the crude epoxidation reaction product contains at least one mole of carboxylic acid for every equivalent of epoxide.

The separation of the epoxide from the acid presents difficulties in that the two tend to react to form monoester or diester derivatives of the epoxy compound. To the extent that this reaction occurs, it leads to contamination of the product and constitutes a loss of epoxy compound and co-product acid. Separation of the epoxide from the acid by distillation is feasible in certain instances, but the method has limitations in that it entails some temperature elevation, with a resulting tendency toward at least some of the undesired side reactions described above. Another drawback of distillation is that, if more than one olefinic compound is present in the olefinic feedstock which has been epoxidized (as is sometimes the case), and if any un-epoxidized olefin is present in the reaction product to be purified, then a lower molecular weight epoxide may boil at nearly the same temperature as an un-epoxidized higher homologue so that separation by distillation is difficult or impossible. These limitations are avoided in a method, described in a co-pending application by Taylor and Sehnert titled "Recovery of Hydrophobic Oxirane Compounds," Ser. No. 608,978 filed on the same date as the present application, whereby dual-solvent extraction is employed to separate hydrophobic epoxides from carboxylic acids of high water solubility, the epoxide being recovered in a non-aqueous solvent and the acid in an aqueous solvent. By utilizing solvent extraction, heating of the crude epoxidation product mixture is avoided and side reactions are minimized. This method, however, deals primarily with the separation of highly water-soluble carboxylic acids from epoxides which are of only limited solubility in water and which, by the process of the invention, can be dissolved preferentially into a non-aqueous liquid. It has deficiencies when the carboxylic acids are of low water solubility or when it is applied to the separation of carboxylic acids from epoxides which have a high degree of water solubility, for example glycidol. Such epoxides, having a high affinity for water, tend either to concentrate largely into the aqeous solvent or, at best, to distribute themselves more or less equally between aqueous and non-aqueous solvents, which interferes with the desired separation.

It is an object of this invention to provide a method for separating strongly hydrophilic epoxides from carboxylic acids while avoiding the temperature elevation inherent in distillation methods. It is a further object of the invention to provide a method for effecting this separation more efficiently than would be the case if use were to be made of a dual-solvent extraction process in which the carboxylic acid is recovered in an aqueous solvent while the epoxide is recovered in a non-aqueous solvent.

Other objects of the invention will be apparent from the following detailed description and claims.

In accordance with the present invention, an epoxidation product mixture comprising a carboxylic acid and a hydrophilic epoxide is separated into an aqueous fraction containing the epoxide and a non-aqueous fraction containing the carboxylic acid by subjecting said product mixture to dual-solvent extraction with two solvents, one solvent being aqueous and the other being a substantially water-immiscible solvent for carboxylic acids. After this separation has been effected the two fractions can be processed further as desired without danger of reaction between epoxide and acid.

By way of illustration, but without limiting its application to these specific compounds alone, the invention will be discussed in connection with the separation of acetic acid from glycidol, these being the major products which result when allyl alcohol is epoxidized with an epoxidizing agent, such as peroxyacetic acid or acetaldehyde monoperacetate, which forms acetic acid as an epoxidation reaction co-product.

It has been discovered that, when glycidol and acetic acid are brought into contact with two immiscible liquid phases, one being water and the other being a mixture comprising a hydrocarbon and an acetate ester, the glycidol concentrates preferentially in the aqueous phase and that the acetic acid likewise concentrates in the aqueous phase preferentially, but not nearly to the same degree as the glycidol. Utilizing this difference in the solubility characteristics of acetic acid and glycidol, it has been discovered that the two compounds can be separated by utilizing dual-solvent extraction.

The following example is given to illustrate the invention further.

EXAMPLE I

One part by weight of a mixture consisting of 50 weight percent glycidol and 50 weight percent acetic acid is fed to the center of an extraction column having the equivalent of 10 theoretical contacting stages. Simultaneously, to the bottom of the column there are fed 2.8 parts of a mixture consisting of 10 weight percent n-heptane and 90 weight percent ethyl acetate while to the top of the column there is fed 1.0 part of water. The column is at a temperature of 23° C. and at substantially atmospheric pressure. From the top of the column an organic phase is withdrawn containing 90% of the acetic acid fed to the column. From the base of the column an aqueous phase is withdrawn containing 90% of the glycidol fed to the column.

Other organic solvents are adapted to the accomplishment of this separation and have been found effective, e.g. mixtures comprising 10%, 20%, and 50% heptane with the remainder being ethyl acetate are all effective. Substituting for the heptane any member of the group consisting of pentane, hexane, benzene, cyclohexane, and diethyl ether, as well as using pure ethyl acetate with no admixture, yields a solvent that is effective, but mixtures containing heptanes are preferred to these.

Higher acetates can be used in place of ethyl acetate. Propyl and isopropyl acetates mixed with hydrocarbons as described above form extraction solvents similar in effectiveness to the ethyl acetate systems. Methylethylketone, alone or mixed with hydrocarbons, can also be used.

The present invention has broad applicability and is not limited to the separation of acetic acid from glycidol. Monocarboxylic acids of more than two carbon atoms, such as propionic acid, butyric acid, benzoic acid, and valeric acid, are easier to recover by the process of this invention than is acetic acid, the ease of recovery increasing with molecular weight of the acid. In such cases, however, it is preferable to use as the solvent for extracting the acid an ester of the acid in question rather than an acetate. This avoids transesterification reactions in the ensuing steps in which the acid will be separated from the extraction solvent, which reactions would contaminate the product acid with acetic acid if an acetate is used as solvent for extracting an acid other than acetic. Esters of the acid being recovered are, in general, suitable acid-extraction solvents. Admixture of a hydrocarbon is generally beneficial, and with higher molecular weight acids a hydrocarbon alone is often adequate. Other solvents can be employed, but esters and hydrocarbons are convenient. The solvent should be substantially chemically inert toward water and toward the mixture being separated at normal extraction temperatures, i.e. about 30° C.

The invention is not limited to the treatment of epoxidation product mixtures containing glycidol as the oxirane component. Other oxiranes are separable from carboxylic acids by the process of this invention, the sole requirements being that said oxiranes be comparatively inert toward water at temperatures in the range of 25–30° C. and that they be of high water solubility, i.e. greater than about 75 grams per 100 ml. of water at 30° C. and preferably miscible in all proportions. Specifically, the invention is applicable in the recovery of 2,3-epoxybutane-1-ol as well as glycidol.

The temperature at which the extraction is conducted should be comparatively low, i.e. below about 30° C. Elevation of the temperature increases the rate of the undesired reactions between oxirane compound and carboxylic acid, the avoidance of which is an object of the invention. Pressure is of no importance so long as it is high enough to prevent vaporization of any volatile components that may be present in the system (e.g. volatile hydrocarbons).

It is preferred that the extraction be conducted countercurrently. Suitable extraction equipment includes but is not limited to plate-type extraction columns, packed columns, centrifugal contractors, columns of the type in which mixing and separating zones are arranged alternately one above the other, and assemblages of mixers and settling vessels arranged alternately and connected for countercurrent flow of two immiscible liquids.

It is to be understood that the foregoing detailed description is merely given by way of illustration and that many variations may be made therein without departing from the spirit of our invention.

The embodiments of the invention in which an exclusive property or privilege is claimed are defined as follows:

1. In a process for producing a hydrophilic epoxy-substituted compound which is a member of the group consisting of glycidol and 2,3-epoxybutane-1-ol by reaction of the corresponding olefinic compound with an epoxidizing agent which forms acetic acid as a by-product of the epoxidation reaction, wherein the epoxidation product is preponderantly a mixture of said epoxy-substituted compound and acetic acid: the improvement which comprises separating said epoxy-substituted compound from said acetic acid by solvent extraction at a temperature below about 30° C. with two extractants which are substantially immiscible with one another, one of said extractants comprising predominantly water and the other extractant comprising predominantly an organic solvent for acetic acid which is a member of the group consisting of methylethylketone, methylethylketone-hydrocarbon mixtures, ethyl acetate, ethyl acetate-hydrocarbon mixtures, ethyl acetate mixed with diethyl ether, acetates higher than ethyl acetate, and mixtures of higher acetates with hydrocarbons.

2. The improved process of claim 1 wherein the epoxy compound is 2,3-epoxybutane-1-ol.

3. The improved process of claim 1 wherein said organic solvent is a mixture of a hydrocarbon and an ethyl or higher ester of acetic acid.

4. The improved process of claim 3 wherein said epoxy compound is glycidol and said organic solvent is a mixture of ethyl acetate with a hydrocarbon.

5. The improved process of claim 4 wherein said hydrocarbon is one of the group consisting of pentanes, hexanes, benzene, cyclohexane, and heptanes.

6. The improved process of claim 5 wherein said hydrocarbon is a heptane.

References Cited

UNITED STATES PATENTS

| 3,077,440 | 2/1963 | Anselm et al. | 260—348 X |
| 3,374,153 | 3/1968 | Naglieri | 260—348.5 X |

FOREIGN PATENTS

| 959,218 | 5/1964 | Great Britain. |

NORMA S. MILESTONE, Primary Examiner

U.S. Cl. X.R.

260—348